3,058,503
MEAT CUTTING DEVICES OR ASSEMBLIES
Minas Perakis, 695 Magnolia, Holly Hill,
Daytona Beach, Fla.
Filed Mar. 28, 1960, Ser. No. 17,904
1 Claim. (Cl. 146—150)

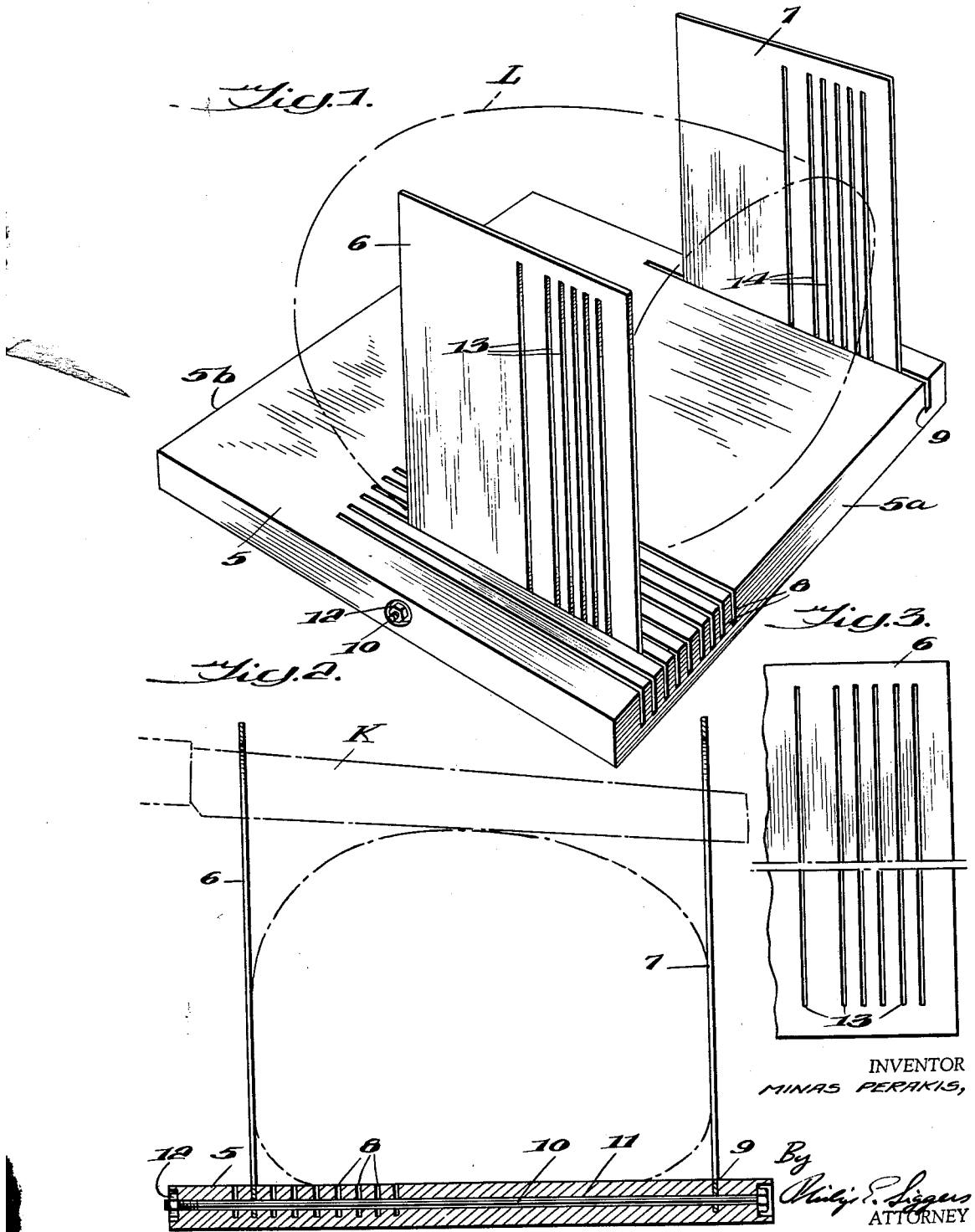

This invention relates to meat cutting devices or assemblies adapted to support a piece of meat or a meat loaf and to guide a hand-held knife as it is moved downwardly to slice the meat or meat loaf.

Among other objects, the invention aims to provide a meat cutting board which is portable, easily manufactured and set-up or disassembled, easily cleaned and scoured and made sanitary; which is adjustable to different sizes of meats and meat loaves; which provides a firm support for the article to be sliced; which may have provision for adjustment or variation in the thickness of the slices by merely substituting different plates in the assembly; and which provides a board that when turned bottom side up presents a plane surface useful for chopping, dicing, kneading and other culinary operations.

These and otther objects will be apparent from the following description of one embodiment of the invention, taken in connection with the accompanying drawings forming a part of this specification.

In said drawings—

FIG. 1 is a perspective view of the cutting board set up to cut a meat loaf, which is shown in phantom;

FIG. 2 is a vertical sectional view showing the cutting board with a meat loaf in the act of being sliced by a knife, also shown in phantom; and FIG. 3 is a fragmentary view of one of the plates.

Referring particularly to the drawings, the meat cutting device of the invention comprises three principal parts, viz., a flat rectangular board 5, preferably of hardwood such as maple or oak, finished on both surfaces, and a pair of thin flat polished metal plates 6 and 7, preferably of stainless steel or other suitable material. The metal plates 6 and 7 are supported in vertical parallel positions on opposite sides of the board, so that a piece of meat or a meat loaf L may be laid on the board and be engaged by both plates. To hold the metal plates vertically, the board has a series of narrow slots or kerfs 8 on one side and a single narrow slot or kerf 9 on the other side. The kerfs 8 may be about 3/16 in. apart, center to center, or may be otherwise spaced; and the kerfs themselves should be just wide enough tto snugly receive the lower edges of plate 6, while kerf 9 snugly receives the lower edges of plate 7. The kerfs 8, 9 do not extend all the way through the board 5 but only part way through; this permits the use of the bottom side of the board for chopping, dicing, kneading and other culinary operations. All of the kerfs 8, 9 are open at one edge 5a of the board but terminate short of the opposite edge 5b; thus the plates 6, 7 may be inserted from the board edge 5a and thrust longitudinally of the kerfs, or if preferred they may be inserted from the top of the board. Obviously the kerfs 8, 9 may be relatively longer than is shown in the drawings and there may be many more in the group or set 8 than the nine kerfs illustrated, so as to permit a wide variation in the spacing of the plates 6, 7. The described arrangement permits adjustment of the spacing of plates 6, 7 relative to each other and adjustment of the positions of the plates in the kerfs while maintaining parallelism of the plates.

While the frictional engagement of the metal plates with the kerfed board 5 will hold the plates, it may be preferred to lock the plates temporarily upon the board. One of the ways the plates may be secured is shown in the drawings: a bolt 10 is thrust through a bore 11 in the base of the board 5 and a hole (or one of a series of holes, not shown) provided in the bottom edges of plates 6, 7, and said bolt is tightened by a nut 12 at the other edge of the board. A headed pin (not shown) inserted manually and held by friction may be used in lieu of a bolt and nut.

When the plates are in proper adjusted position to be contacted by the piece or article L to be sliced, the knife K is inserted point-first through verticle slits 13, 14 provided in plates 6, 7 respectively. These slits 13, 14 are close together and are parallel but are closed at the top, that is, they do not extend to the upper edges of the plates. The slits are so spaced as to permit even slicing of the meat; each slice is of exactly the same thickness as the other slices, and none of the slices become thicker or thinner as the knife descends. These are important advantages especially in the restaurant business. One of the slits 13a, 14a may be spaced apart farther than the other slits of the group, so that if desired a thick slice of uniform predetermined thickness may be cut.

The many advantages of the device will be obvious to those skilled in the art from the foregoing description and the accompanying drawings. It is obvious that the invention is not limited to meat slicing but may be useful for slicing or cutting other foodstuffs such as cake, bread etc.

Having described one embodiment of my invention without limiting myself thereto, what I claim as new and desire to secure by Letters Patent is:

A device for slicing meat and the like comprising, in combination, a flat solid rectangular board with four side edges, said board having a series of straight parallel thin vertical kerfs formed therein and open at their tops, but extending from the top surface of the board only part way through the board, said kerfs all being open at one side edge of the board and terminating short of the opposite side edge of the board; a pair of thin flat rectangular plates frictionally supported in a selected pair of said kerfs so as to be vertical and parallel, said plates being adjustably spaced apart by vertical insertion in various pairs of kerfs so as to receive between them objects of different sizes to be sliced while supported on said board; each plate having a plurality of closely spaced slits running vertically, the slits of one plate being alignable with the slits of the other plate, the upper ends of said slits terminating short of the upper edges of the plates, said slits being wide enough to admit a blade of a slicing knife but narrow enough to guide the slicing knife as it descends in the act of slicing said objects; means extending through the board transversely of the plates and engaging the lower edges of the plates below the top surface of the board to lock the plates when supported in said kerfs; the bottom surface of said board being plane and unbroken so that the board may be turned over, after removal of the plates, and used as a chopping, dicing, cutting or kneading board or for other culinary purposes.

References Cited in the file of this patent

UNITED STATES PATENTS

| | | |
|---|---|---|
| 2,356 | Cole | Nov. 12, 1841 |
| 597,013 | Miller | Jan. 1, 1898 |
| 665,066 | Cooley | Jan. 1, 1901 |
| 1,867,993 | Tuttle | July 19, 1932 |